Sept. 5, 1944.  N. K. CHANEY  2,357,315
PRODUCTION OF VALUABLE HYDROCARBONS
Filed Oct. 28, 1939  2 Sheets-Sheet 1
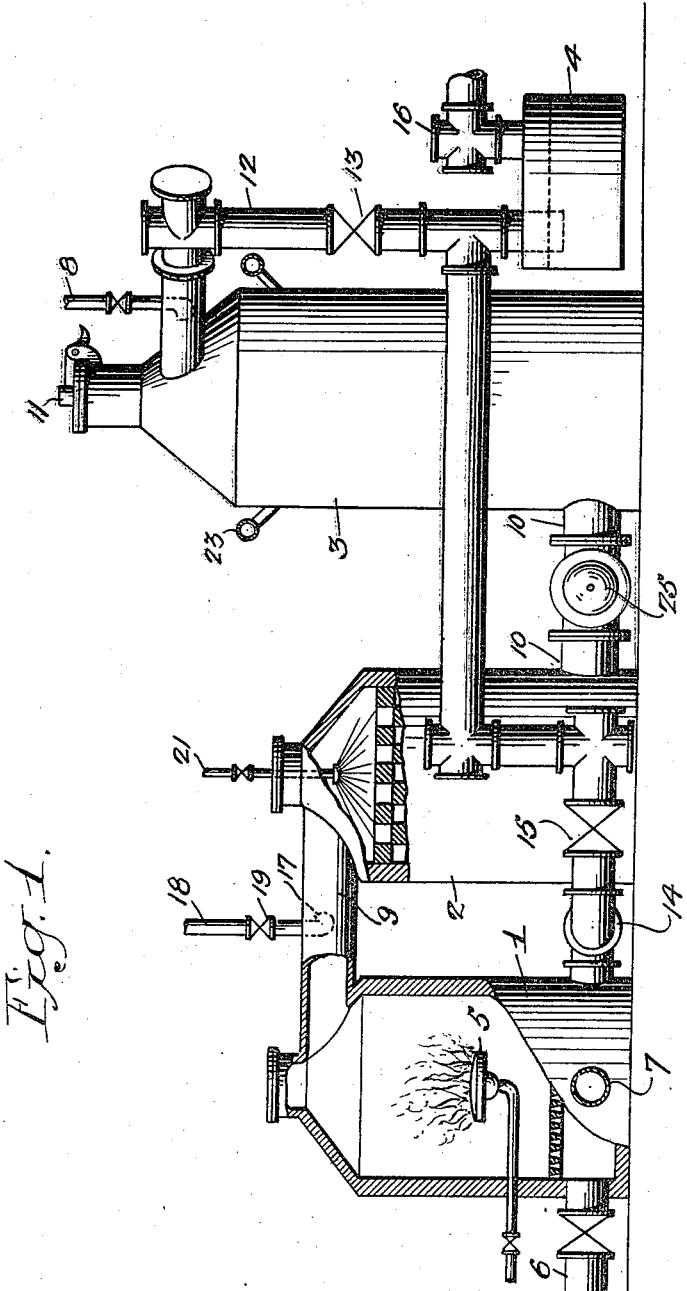
Inventor
Newcomb K. Chaney
by his Attorney.
Hugo A. Kenman

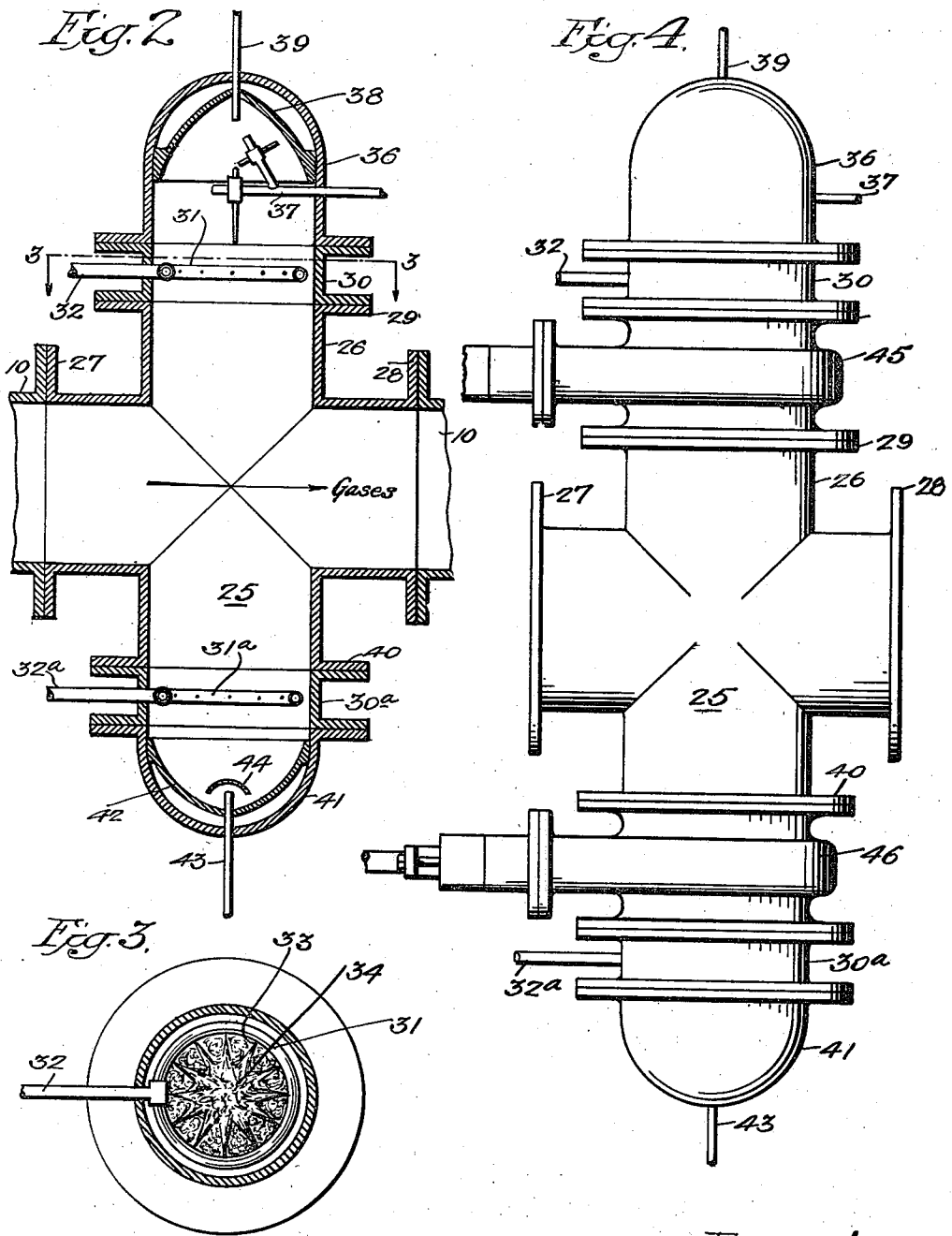

[Patented Sept. 5, 1944]

UNITED STATES PATENT OFFICE 2,357,315

PRODUCTION OF VALUABLE HYDROCARBONS

Newcomb K. Chaney, Moylan, Pa., assignor to The United Gas Improvement Company, a corporation of Pennsylvania Application October 28, 1939, Serial No. 301,693

11 Claims. (Cl. 204—168)

This invention pertains generally to the simultaneous production of manufactured gas and valuable hydrocarbons, and pertains particularly to a method for increasing the yield of desirable hydrocarbons.

For convenience, the invention will be described in connection with the manufacture of oil gas, but it is to be understood that it may have other applications. For instance, it is broadly applicable to any process wherein petroleum oil is pyrolytically decomposed in vapor phase for the production of desired hydrocarbons.

The manufacture of oil gas involves the cracking of petroleum oil to form hydrogen and hydrocarbon gases.

While in normal practice by far the larger part of the petroleum oil finds its way into fixed gas or in other words into gases which are liquefied with difficulty, such as hydrogen, methane, ethylene, and possibly other gaseous paraffins and olefins, there is nevertheless a certain portion of the oil which is used up in the production of tar, drip oil, and lower boiling condensible hydrocarbon substances, the quantity of the latter recovered depending upon the construction and operation of the recovery system employed.

The tar, drip oil and lower boiling condensates contain a wide variety of hydrocarbons, the number and quantity of which vary with the manner in which the oil is decomposed and with the extent to which the gas is processed for the recovery of low boiling condensates.

As an example, saturated and unsaturated hydrocarbons such as benzene, toluene, xylene, ethyl benzene, naphthalene, anthracene, indene, styrene, methyl styrene, cyclopentadiene, dicyclopentadiene, isoprene, piperylene, butadiene, isobutylene, etc. might be detected in small quantities or recovered in substantial amounts. All of the hydrocarbons mentioned are valuable, the unsaturated compounds perhaps more so than the others.

The unsaturated hydrocarbons are coming more and more into industrial demand, but their wide use is handicapped by limited sources of supply.

Although in conventional oil gas or carburetted water gas practice some reactions forming hydrocarbons may be sufficiently rapid to reach equilibrium within a short time, it appears that many of the reactions involved in the production of the more rare or valuable hydrocarbons are too slow to proceed to a substantial extent before many valuable products begin to decompose due to the high temperatures involved. Increase in either time or temperature is accordingly not helpful since this would increase the destruction of valuable products.

I have discovered that many of the desirable reactions may be very materially speeded up to give larger yields or, if desired, the reaction time correspondingly or otherwise shortened to lower the destruction of valuable products, by introduction of a suitable catalyst or catalysts into the gas stream, as described and claimed in my copending application Serial Number 199,115 filed March 31, 1938, now Patent 3,327,842, dated August 24, 1943. If desired, somewhat lower temperatures may also be employed.

For instance the reaction

$$C_6H_5CH_2CH_3 \rightarrow C_6H_5CH=CH_2 + H_2$$

is greatly speeded up by the presence of materials such as the oxides of calcium, strontium, manganese, zirconium, etc. The same applies to other alkylated benzenes for instance isopropyl benzene.

The compound $C_6H_5CH=CH^2$ is known as styrene and is one of the more valuable materials present in gas condensates.

A reaction taking place in the gas stream with the production of ethyl benzene is the following:

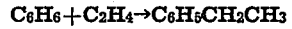
$$C_6H_6 + C_2H_4 \rightarrow C_6H_5CH_2CH_3$$

This reaction is catalyzed by anhydrous aluminum chloride.

Divinyl benzene is formed by the following series of reactions.

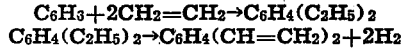
$$C_6H_3 + 2CH_2=CH_2 \rightarrow C_6H_4(C_2H_5)_2$$
$$C_6H_4(C_2H_5)_2 \rightarrow C_6H_4(CH=CH_2)_2 + 2H_2$$

The second step is catalyzed by either zinc oxide or anhydrous aluminum chloride.

Many other reactions between materials present in the gas stream may be catalyzed with the formation of more valuable products.

For instance it has been stated (1) that ethylene, propene, butadiene, isoprene and higher olefins may be obtained from methane using a catalyst comprising copper oxide and carbon; (2) that benzene and toluene may be produced from butane in the presence of catalysts such as iron and nickel; (3) that butadiene may be obtained from butane using magnesium oxide as a catalyst; (4) that diphenyl may be prepared from benzene using a nickel-chromium catalyst; etc.

Furthermore actinic or photochemical rays of any desired band or bands of frequencies may be employed in conjunction with or apart from the use of catalysts to cause desired reactions to take place at practicable rates.

This invention comprises an improvement over the invention of my copending application and pertains more especially to an improved method and apparatus for the introduction of catalyst and photochemical or actinic rays into the gas stream.

Other features of the invention reside in the steps, combinations of steps, and sequences of steps, and in the construction, arrangement and combination of parts, all of which together with other features will become more apparent to persons skilled in the art as the specification proceeds and upon reference to the drawings in which:

Figure 1 is an elevation, partly in section, illustrating a conventional 3 shell water gas set with the invention adapted thereto;

Figure 2 is a section shown broken of the connection between the carburetter and superheater of Figure 1;

Figure 3 is a section on line 3—3 of Figure 2; and

Figure 4 is an elevation illustrating a modification.

Referring more particularly to Figure 1, 1 indicates a generator, 2 a carburetter, 3 a superheater and 4 a wash box.

Generator 1 is illustrated as having a fuel burner 5 for burning tar, oil, gas or other fuel, an up run air blast supply 6, and a forward run steam supply 7.

Superheater 3 is shown with a reverse run steam supply 8.

Generator 1 is provided at its top with an off-take 9 leading to the top of the carburetter 2, and carburetter 2 is provided at its base with an off-take 10, leading to the base of the superheater 3.

Superheater 3 is shown with a stack valve 11 and a gas off-take 12, the latter leading to wash box 4 through valve 13.

Generator 1 has a gas off-take 14 at its base provided with valve 15. Gas off-take 14 leads to wash box 4.

Wash box 4 is shown with the conventional gas off-take 16.

The apparatus so far particularly described is for purposes of illustration. Any other gas making equipment employing a run with oil might have been substituted for the purposes of describing the invention.

The operation of the apparatus so far referred to will be described with a conventional cycle.

The fuel is supplied to burner 5 and is burned with air supplied at 6.

The resulting hot blast gases pass up through the generator, through off-take 9, down through the carburetter 2 and up through superheater 3 raising the temperatures of the carburetter and superheater and storing heat therein, and finally escape through stack valve 11, or to a waste heat boiler not shown.

The following table will illustrate a common swing in temperatures at various points in a set during a typical blast.

Table

| Point in set | Temperature °F. start of blast | Temperature °F. end of blast |
|---|---|---|
| Carburetter top | 1,250 to 1,350 | 1,800 to 2,000 |
| Carburetter middle | 1,275 to 1,375 | 1,500 to 1,700 |
| Superheater base (also carburetter base) | 1,300 to 1,400 | 1,325 to 1,425 |
| Superheater middle | 1,325 to 1,375 | 1,335 to 1,385 |
| Superheater top | 1,275 to 1,325 | 1,275 to 1,325 |

After the air blasting operation the set is purged of blast gases by steam admitted at any convenient point, such as 7 or 17, or both, whereupon stack valve 11 is closed, valve 13 is opened and a forward run is made during which steam is supplied at either 7 or 17, or both.

Supplying steam at 7 has the effect of causing the steam to pass up through the generator, whereupon it becomes highly superheated before reaching the carburetter, thus relieving the carburetter of the duty of furnishing this superheat.

It will, of course, be understood that a part of the steam may be admitted at 7 and a part at 17, thus making it possible to regulate the temperature of the steam entering the top of the carburetter 2, or all of the steam may be admitted at 17 with or without any desired degree of preheat.

Although the point of introduction of oil may vary in different gas making equipment, for convenience in description I have illustrated an oil spray 21 at the top of carburetter 2.

Irrespective of the construction of the inside of the carburetter, which may vary widely in different types of apparatus, it is customary to have a substantial part of this oil come directly into contact with the heated surfaces, whether they include checkerbrick or other construction or comprise merely the refractory side walls. However, whether coming into contact with the heated surfaces or not this oil is subjected to the temperatures of the carburetter and superheater as it is carried along by the steam, and is cracked into gas, coke, tar, drip oil and other condensibles. A large part of the coke is usually deposited in the carburetter and superheater and the condensible materials are usually carried out of the superheater along with the gas and are condensed at the wash box or further on in other condensing equipment.

After the forward run, if desired, a reverse run might be made as follows:

Valve 13 is closed, valve 15 opened and steam is reversed through the set by admitting it at 8, while injecting oil into the top of the superheater 3, through any suitable mechanism, illustrated generally at 23.

This oil is carried down through the superheater 3, and up through the carburetter 2, and is cracked into hydrogen and hydrocarbons, which pass down through generator 1 with possibly some further pyrolysis or fixing and off through off-take 14 directly to wash box 4.

Some of these hydrocarbons are likewise condensed at the wash box or further on in other condensing equipment.

To complete the cycle the reverse run with steam is followed by a forward purge with steam.

It is, of course, understood that any other cycle might be substituted. For instance, the reverse run might be omitted entirely.

The conditions in the carburetter as well as in the superheater during either run, and perhaps also in the generator during a reverse run, are such that a wide variety of reactions are possible between the various hydrocarbons or hydrocarbon radicles present, saturated and unsaturated.

Examples of reactions have already been given.

In accordance with this invention I introduce into the gas stream desired catalytic materials or desired actinic or photochemical rays, or both, through a fluid material capable of protecting the source of said additives from the gas making environment and vice versa.

As pointed out in my above mentioned copending application, there is a wide variety of catalysts that might be employed, depending upon the results desired. A difficulty, however, presents itself as to the practicable introduction and use of catalysts in a gas making operation.

It is known that all materials including all of the elements, their oxides and other compounds, vaporize at the temperatures of the electric arc. In fact certain substances are so refractive as to be non-vaporizable by other means. The temperatures of an arc. however, are so high as to destroy practically all of the more valuable products with the formation of large quantities of carbon and hydrogen and low molecular weight hydrocarbons, such as methane, ethane, ethylene, etc., a condition which I purposely wish to avoid.

While I make use of an arc for dispersing catalyst in finely divided form throughout the highly heated gas stream to speed up desired reactions, I do it in a manner so as not to subject any substantial portion, if any, of the gas stream to the high temperatures of the arc.

Dispersion of catalyst in accordance with my invention is accomplished by incorporating it in the electrodes of an arc placed such that the arc vapors or their condensation or solidification products or any mixture of the foregoing find their way into the gas stream, but the arc itself is so arranged that no very substantial portion of the gas, if any, is subjected to the high temperatures of the arc.

The manufacture of electrodes generally and particularly of carbon electrodes having incorporated therein other substances is well understood by persons skilled in that particular art, and the prior art is replete with methods and apparatus for this purpose.

In the practice of my invention the catalyst is at first vaporized by the very high temperatures of the arc and this vapor or its condensation or solidification products, or mixtures thereof, diffuse out into and are mixed with the gas stream. Since the temperatures of the protecting fluid and of the reacting gases are below the condensing or freezing temperatures of the catalysts usually employed, catalyst vapors upon cooling are transformed into widely dispersed, discrete catalyst particles which are mixed with and carried along by the gas stream. These particles catalyze the desired reactions thus increasing the yield of the desired products.

A part of these widely dispersed catalyst particles is deposited on the refractory brick of the carburetter and/or superheater, and/or generator depending, of course, upon the position of the arc, and whether a reverse run is employed, and the rest is carried out with the gas and is deposited further on in the gas making equipment such as in the wash box.

That portion of the catalyst which is deposited on the refractory brick if not poisoned or coated with carbon assists in catalyzing the desired reactions.

The rays emitted by an arc are largely actinic or photochemical in character and desired wave bands may be obtained by adjustment of the composition of the electrodes in a well known manner. Thus any desired character of actinic or photochemical effect is afforded.

I find that it is advantageous to remove the arc from the gas stream and to provide an intermediate protecting fluid not only to more completely prevent the hydrocarbon gases from being subjected to the temperatures of the arc, but also to protect the arc and its accessory structure from the environment of the gas making operations such as the blast or the run or runs, or any combination or all of the foregoing.

The arc and its accessory structure are thus more completely protected from the deposition of carbon, which is generally undesirable particularly on the electrodes. Furthermore, my invention makes it possible to better maintain in an operative condition accessory devices, such as the electrode operating mechanism and any reflectors employed to reflect photochemical or actinic rays from the arc into the gas.

Any deposition of carbon or other substance upon a reflector will, of course, greatly decrease its reflecting efficiency.

Moreover, it is desirable to protect the electrode supporting and operating mechanism and the reflectors from the high temperatures of gas making operations.

While the arc or arcs may be positioned at any desired point or points along the gas stream, such as at one or more points along the carburetter or the superheater or downstream from the superheater or along the generator, or along the backrun pipe, or any combination of the foregoing, for the purposes of illustration, I have illustrated generally in Figure 1 the installation of a recessed arc in pipe 10 which connects the base of carburetter 2 with the base of superheater 3; the inserted structure being generally referred to by reference numeral 25.

Structure 25 is shown in section in Figure 2 as comprising a four-way coupling 26 having opposed flanges 27 and 28 for engagement with cooperating flanges of pipe 10 so as to provide an unobstructed path for the free flow of gases therethrough.

Attached to flange 29 of coupling 26 is a flanged pipe section 30 provided with a circular fluid distributor 31 having a feed pipe 32 and a plurality of spaced apertures 33 spaced along its inner periphery as indicated in order to provide when in operation a fluid curtain indicated at 34 in Figure 3.

It will be understood that the outer periphery of distributor 31 may also be provided with spaced apertures, if desired, to provide an annular fluid curtain between it and the inner wall of pipe section 30.

Attached to pipe section 30, such as by suitable flanges, is shown an arc housing 36 in which is conventionally illustrated arc supporting and operating mechanism 37. Mechanism 37 may be of any construction known in the art and suitable for the purpose. Therefore no attempt has been made to show the structure of mechanism 37 in detail.

Also contained in housing 36 is reflector 38 which may be parabolic with the arc positioned at the focus so as to reflect parallel rays or of any other desired configuration, or with the arc otherwise positioned, for instance, such as to concentrate the rays in the gas stream.

To assist in the protection of reflector 38 and to cause dispersed catalyst whether in vapor form, or partly or wholly condensed and/or solidified to find its way more readily out into the gas stream, fluid inlet 39, which may be suitably positioned at any point in housing 36, such as at the center of the reflector, has been shown.

While the fourth opening in coupling 26 might be closed off, such as by a suitable cover plate attached to flange 40, I have shown a duplicate of flanged section 30 designated as 30a, and a second housing designated as 41.

While housing 41 might be a duplicate of housing 36 together with its internal structure, I have merely illustrated a reflector 42 which is preferably so positioned as to cooperate with reflector 38 in causing the gas flowing through coupling 26 to be exposed to the actinic rays of the arc or arcs.

Thus, reflector 42 in the construction shown may be designed to pick up any photochemical rays passing through the gas stream and reflect them back into the gas stream.

For instance, reflectors 38 and 42 might both be of parabolic configuration, or reflector 38 might be parabolic, and reflector 42 might be designed to concentrate rays at a point or along a line in the gas stream, or reflectors 38 and 42 might be designed to cooperate in any other suitable manner.

To assist in preventing deposits upon reflector 42, a fluid inlet 43 is illustrated. However, it will be seen that in view of the fluid curtain provided in section 30a, inlet 43 might be dispensed with. The same applies to inlet 39, however, not to the same extent in view of the desirability of having rapid diffusion of dispersed catalyst out into the gas stream.

The gases of the blast, of the run or runs, and of the various purges pass without obstruction through coupling 26.

Fluid distributor 31 and fluid distributor 31a, if the latter is employed, preferably operate throughout both the blast and the run or runs. In fact, since the purges are relatively short, they may operate continuously. However, my protecting fluid may be employed in any other desired manner.

I find that steam is excellently suited for forming the fluid curtains 34 since steam is subject to wide temperature control, is to some extent pervious to photochemical or actinic rays, and is compatible with gas making processes.

The stream not only prevents the blast and run gases from reaching the housings 36 and 41 but being subject to temperature control it may be employed to maintain the interiors of housings 36 and 41 at any desired lower temperature than that of the gas stream.

The injection of steam through inlets 39 or 43, or both is to some extent at least optional when the fluid curtains 34 are employed.

If desired, the injection of steam through inlets 39 and 43 may be employed without the fluid curtains 34 in which case pipe sections 30 and 30a may be eliminated.

It will be seen that the use of steam, or other suitable fluid, for the purposes indicated provides a means for condensing and/or solidifying any part or all of the catalyst vapors prior to entering the gas stream, thus instantly providing active dispersed catalyst in the extremely rapidly moving gas stream.

It is, of course, understood that arc mechanism 37 need operate only during the period that a gas making run is being made. However, it may operate continuously or otherwise as desired. Should it be desired the arc mechanism 37, of course, may be operated during only a portion of a run, or during alternate runs, or in any other desired manner.

Since the temperatures of the blast gases are somewhat higher than the temperatures of the run gases, and since it is unnecessary to irradiate or catalyze the blast gases, gate valves might be inserted between the housings (36 and 41) and coupling 26, these valves being closed during the blast and open during the run or runs.

This is illustrated in Figure 4 wherein gate valves 45 and 46 are shown inserted between coupling 26 and pipe sections 30 and 30*a* respectively, housings 36 and 41 being in turn connected to pipe sections 30 and 30*a* the same as in Figure 2.

By closing gate valves 45 and/or 46 during the blast, the possibility of blast gases reaching housings 36 and/or 41 is entirely obviated.

Alternately, water or cold steam may be employed in the fluid distributors 31 and/or 31*a* to protect their respective housings from the hotter blast gases. It is conceivable that these might also be used during the run or runs, if desired.

As another modification, a cap 44 has been illustrated in Figure 2 positioned over the mouth of the inlet 43 to deflect incoming steam against reflector 42 to sweep away foreign particles from the reflector surface. This might be also used over the mouth of inlet 39. The back of cap 44 might be made into a reflector if desired to compensate for any masking effect it might have on reflector 42.

While I have shown the installation of an arc in pipe 10, it is to be understood that one or more arcs may be installed at any other point or points, having in mind that the catalyst and/or photochemical rays are employed to speed up one reaction at the expense of another and the catalyst and/or photochemical rays accordingly should be used while the gas is still in a highly reactive state as a result of the oil decomposition.

Should it be desired to install an arc or arcs intermediate the ends of the carburetter, or of the superheater, or of the generator, this may be done conveniently at manhole openings, or by making openings similar to manhole openings, or otherwise.

If desired, such openings might be lined with refractory materials. As a rule, however, the temperatures of the carburetter and superheater are not so high as to prevent the use of exposed high melting alloys.

An arc or arcs might be installed in pipes 12, 9, and/or 14 of Figure 1 in the same manner as illustrated in pipe 10 having in mind what has been said above about chemical reactivity of the gas.

Furthermore, it is to be understood that any part of the gas less than the whole may be subjected to treatment. Or a part of the gas may be withdrawn, subjected to treatment and returned for further reaction with the remaining gas. Other variations are possible.

Means for adapting my invention to other types of gas-making equipment will suggest themselves to persons skilled in the gas-making art upon becoming familiar herewith.

Likewise, means for adapting my invention to high pressure cracking operations and particularly to vapor phase and mixed phase cracking operations, will suggest themselve to persons skilled in the art upon becoming familiar herewith.

Therefore, although it has been convenient to describe the invention in connection with a conventional gas set, it is to be understood that this is not by way of limitation, and that the invention may be applied to the cracking of petroleum oil in general.

For instance, any means for heating the carburetter and superheater may be substituted for the fuel burner 5. For example, a fuel bed might be employed. If desired, the invention may be adapted to carburetted water gas operations.

In fact the invention might be applied to any other gas-making operation, such as to the manufacture of coal gas or even producer gas, if desired, for any reason.

By proper selection of materials to be incorporated in the electrodes, photochemical radiations of any desired frequency or band of frequencies may be obtained for activation or ionization of the molecules and to cause them to unite.

A wide variety of materials which may be incorporated in arc electrodes for obtaining irradiations of desired photochemical frequencies are well known in the art. Examples are the various metals. Such materials themselves may or may not act as catalysts in the gas stream.

In this way irradiations are obtained which could not otherwise be obtained except by using much higher temperatures. Very high temperatures are to be avoided in the production of valuable hydrocarbons since very high temperatures break down the desired products.

It will be seen that my invention provides a wide flexibility with respect to the use of photochemical rays and catalysts. That is they may be employed either severally or in any desired combination. The several uses of photochemical radiations has already been referred to. To obtain the several use of catalyst a suitable opaque gas might be substituted for or mixed with the steam either with or without the removal from service (by any suitable means) of the reflectors, or the arc may be so positioned that the photochemical and other rays do not find their way into the gas stream. As an illustration of the latter, a right angle or other turn may be inserted between housings 26 and 36.

The catalyst or catalysts may be divided between the electrodes in any desired manner or all of the catalyst or catalysts may be incorporated in one of the electrodes of the arc. Therefore, while it is simpler to have both electrodes of an arc of the same composition, this is by no means a necessary feature.

Moreover, the catalytic material itself, that is without admixture, may comprise one or even both of the electrodes. In other words, the incorporation of the catalytic material with other material, such as carbon, is not an indispensible feature.

When the catalytic material is incorporated with other material, such as carbon, it may be in the free state or may be chemically combined. In other words, the materials supplied to the arc to in turn supply the catalyst need not be the catalyst itself, but may be material or materials from which the desired catalyst is produced under the existing conditions.

Other variations will suggest themselves to persons skilled in the art upon becoming familiar with this invention.

While the operation of the invention has been described chiefly in connection with vaporization of the catalyst followed by condensation and/or solidification, it is to be understood that the disruptive forces of the flow of current across an electric gap and especially by electric discharge may under proper conditions be made to disperse considerable catalyst in the solid and/or liquid phase. Furthermore in the case of the so-called gaseous catalysts, condensation and/or solidification obviously need not follow vaporization.

Other sources of photochemical or actinic rays, such as high voltage spark discharges, mercury vapor lamps, and similar devices might be substituted for the arc mechanism 37 in housing 36.

My fluid curtain is not only excellently adapted to permit the operation of these devices at lower temperatures than those of the gas stream but also to prevent any quartz or other light pervious substance enclosing the source of radiation from being coated with carbon or other opaque material.

Although the invention has been described in connection with the cracking of petroleum oil, whether in the form of crude or any suitable fraction thereof such as gas oil or residuum, it is to be understood that it is applicable to the cracking of other hydrocarbon materials such as tar (of which coal tar, water gas tar, and oil gas tar are examples) and hydrocarbon gases (of which natural gas and refinery gas are examples).

Having described my invention it will be understood that changes, omissions, additions, substitutions and/or modifications may be made within the scope of the claims without departing from the spirit of the invention which is limited only as required by the prior art.

I claim:

1. Gas making equipment comprising a hydrocarbon oil vaporizing and cracking chamber, a conduit for withdrawing gas formed in said chamber, an arc housing adjacent said conduit and communicating therewith, a high temperature electric arc disposed in said housing and removed from the normal path of flow of gas in said conduit, and means in said housing for creating an atmosphere of steam between said arc and said normal path of flow of gas whereby the preponderant part of said gas is shielded from thermal effects of the arc.

2. Gas making equipment comprising a hydrocarbon oil vaporizing and cracking chamber, a conduit for withdrawing gas formed in said chamber, an arc housing adjacent said conduit and communicating therewith, a high temperature electric arc disposed in said housing and removed from the normal path of flow of gas in said conduit, steam inlet means in said housing arranged to create an atmosphere of steam between said arc and said normal path of flow of gas whereby the preponderant part of said gas is shielded from thermal effects of the arc, and means for vaporizing a catalyst by means of said arc, said catalyst being capable of promoting desired hydrocarbon forming reactions.

3. In the production of valuable hydrocarbons by the thermal cracking of petroleum oil in the vapor phase, the steps of favoring a hydrocarbon-producing reaction involved in said cracking by dispersing into the vapor phase undergoing cracking a finely divided catalyst for said reaction, said catalyst being vaporized by means of an electric arc and having a melting point sufficiently high to cause said catalyst to solidify under the temperature conditions of said cracking, interposing a protective curtain of a second gas between said vapor phase undergoing cracking and said arc to prevent contact of the preponderant portion of said vapor phase with said arc, and causing said second gas to flow from said arc into said vapor phase to contact said catalyst with said vapor phase.

4. In a catalytic process for producing valuable hydrocarbons by the vapor phase cracking of petroleum oil in which a catalyst for a hydrocarbon-producing reaction taking place in the course of said cracking is dispersed into the vapor phase being cracked said catalyst being vaporized by means of an electric arc operating under higher temperature conditions than those maintained in said cracking, the steps of protecting said vapor phase from undesired decomposition due to the high temperature of said arc by interposing a shielding flow of steam between said arc and said vapor phase while employing said steam to assist in carrying said catalyst in finely divided form into said vapor phase.

5. Apparatus for the vapor phase pyrolysis of petroleum oil with the production of valuable hydrocarbons comprising a heated oil vaporizing and gas-making path, means for introducing petroleum oil thereto and for leading the resulting vapor phase therethrough, high temperature electric arc means arranged in confronting relation to said path, means for vaporizing a catalyst by said arc, steam admission means arranged to interpose a curtain of steam between said arc and the preponderant portion of said vapor phase flowing through said path and arranged to cause said steam to flow into said path, whereby said curtain of steam protects the preponderant portion of said vapor phase from contact with said arc while carrying said vaporized catalyst into said vapor phase for contact therewith.

6. In the production of valuable hydrocarbons by the vapor phase pyrolysis of petroleum oil in the presence of a catalyst for a hydrocarbon-producing reaction involved in said pyrolysis, said catalyst being dispersed in finely divided form by means of an electric discharge between electrodes, the step of causing a shielding flow of a second gas from said electric discharge into said vapor phase undergoing pyrolysis to minimize contact between said vapor phase and said electric discharge and to assist in carrying said finely divided catalyst into said vapor phase for contact therewith.

7. In the production of valuable hydrocarbons by the thermal cracking of petroleum oil in vapor phase in the presence of a catalyst for a hydrocarbon reaction involved in said vapor phase cracking, the steps of dispersing said catalyst in finely divided form from a high temperature electric arc into a second gas; and causing said second gas to flow from said arc into said vapor phase undergoing pyrolysis thereby bringing said dispersed catalyst into contact with said vapor phase undergoing pyrolysis while minimizing decomposition of said vapor phase as a result of high arc temperatures by preventing contact of the preponderant part of said vapor phase with said arc.

8. In the production of valuable hydrocarbons by the thermal cracking of petroleum oil in vapor phase, wherein a hydrocarbon-producing reaction involved in said cracking is favored by the presence in said vapor phase of a finely divided catalyst for said reaction, the steps of vaporizing said catalyst by means of an electric arc, said catalyst having a boiling point sufficiently high to prevent said catalyst from remaining in vapor phase under the temperature condition of said cracking; interposing a protective flow of a second gas between said vapor phase undergoing pyrolysis and said arc to prevent contact of the preponderant portion of said vapor phase with said arc; and causing said second gas to flow from said arc into said vapor phase to carry said catalyst into contact with said vapor phase.

9. In a vapor phase pyrolysis of petroleum oil with the production of valuable hydrocarbons in a cyclic process in which heat is stored in a gas making path during a heating period in said cycle and the resulting stored heat employed for the pyrolysis of vaporized petroleum oil in said gas-making path during a gas-making portion of said cycle, the steps comprising catalyzing a hydrocarbon-producing reaction involved in said pyrolysis by contacting vapor phase hydrocarbon material undergoing pyrolysis with a catalyst for said reaction, said catalyst being dispersed in said vapor phase material undergoing pyrolysis during said gas-making portion of said cycle by means of an electric arc, and interposing a shielding flow of a second gas between said vapor phase and said arc to reduce contact between said vapor phase and said arc, said flow of said second gas assisting in carrying said dispersed catalyst into contact with said vapor phase.

10. Apparatus for the vapor phase pyrolysis of petroleum oil comprising a heated pyrolyzing path, means for supplying heat to said path for said pyrolysis, means for passing petroleum oil in vapor phase along said path for pyrolysis therein, and an electric arc disposed in a housing adjacent to said heated path and removed from the normal travel of said vapor phase along said heated path, said housing being in gas flow communication with said path and said housing being provided with means for causing a shielding flow of gas from said housing into said path, whereby contact between the preponderant part of said vapor phase and said arc is prevented.

11. Apparatus for the vapor phase pyrolysis of petroleum oil comprising a heated petroleum oil pyrolyzing path, means for supplying heat to said path for said pyrolysis, means for passing petroleum oil in vapor phase along said path for pyrolysis therein, an electric arc disposed in a housing adjacent to said path and removed from the normal travel of said vapor phase along said path, said housing being in gas flow communication with said path and said housing being provided with means for causing the shielding flow of gas from said housing into said path whereby contact between the preponderant part of said vapor phase and said arc is prevented, and reflecting means so positioned in said housing with respect to said arc as to reflect radiation from said arc toward said vapor phase in said path.

NEWCOMB K. CHANEY.